Jan. 15, 1924. 1,480,922
J. M. WEYDELL
ELECTRIC HEATER
Filed April 16, 1921
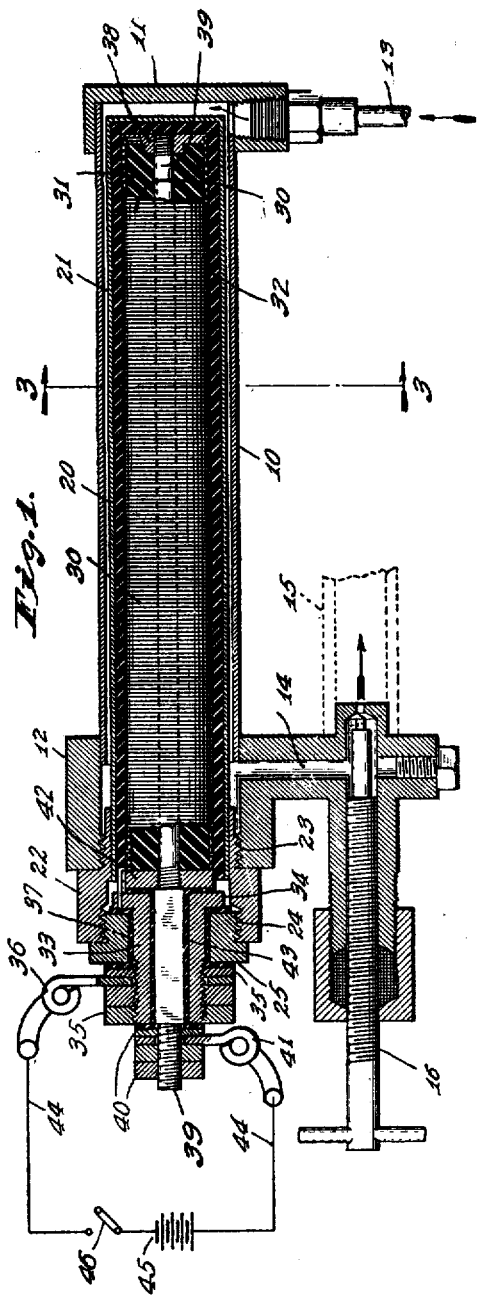
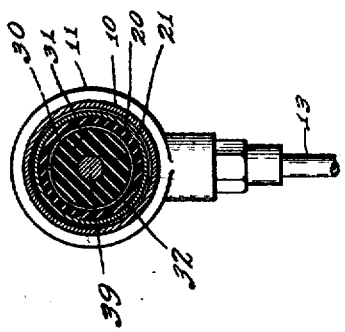
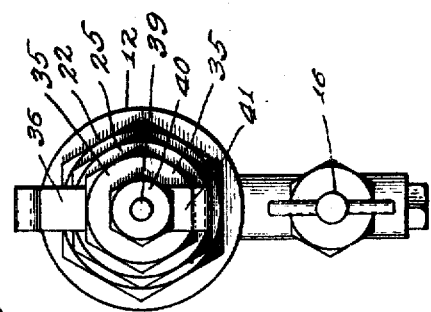
Inventor
Jarl M. Weydell,
By Howdoghby
Attorneys Patented Jan. 15, 1924.

1,480,922

UNITED STATES PATENT OFFICE.

JARL M. WEYDELL, OF INDIANAPOLIS, INDIANA, ASSIGNOR OF ONE-HALF TO EDWARD C. STOUT.

ELECTRIC HEATER.

Application filed April 16, 1921. Serial No. 461,836.

*To all whom it may concern:*

Be it known that I, JARL M. WEYDELL, a citizen of Finland, residing at Indianapolis, in the county of Marion and State of Indiana, have invented a new and useful Electric Heater, of which the following is a specification.

It is the object of my invention to produce a simple electric heater, for heating and vaporizing liquids, particularly hydrocarbon fuels; which heater acts on the liquid in a thin sheet, permits the heater to be heated by external heat, such as a flame from a burner, as well as by the electric heater, and can be taken apart for inspection, repairs, and cleaning, either by removing only the heating element while leaving the liquid-conducting portion intact so that the supply of fuel to a burner will not be interrupted, or by removing separately (after first removing the heating element) or with the heating element the casing directly enclosing it and forming one wall of the liquid passage.

The accompanying drawing illustrates my invention: Fig. 1 is a longitudinal central section through an electric heater embodying my invention, showing the connections thereof to a source of fuel supply and to a burner; Fig. 2 is an end elevation, taken from the left of Fig. 1; and Fig. 3 is a section on the line 3—3 of Fig. 1.

An outer tubular casing 10 has its ends suitably fitted, with leak-tight joints, in end members 11 and 12, the former being connected by a pipe 13 to any suitable source of liquid fuel, if the heater is used for vaporizing hydrocarbon fuel, and the latter being connected by a passageway 14 to any suitable burner 15, the outlet from the passage 14 to the burner 15 being controlled by a manual valve 16. The burner 15 may be located below the casing 10, so that part of the flames from the burner 15 may play on the casing 10 and heat it after the burner has been started into operation, so that the current used for the preliminary electric heating of the fuel need be supplied only for a short time.

Within the outer casing 10 is an inner tubular casing 20, which is spaced from the inner surface of the casing 10 to leave a thin annular space 21 through which the fuel must pass when traveling from the pipe 13 to the passage 14. The inner tubular casing 20 is closed at one end (the right-hand end), and at the other is suitably mounted, with a leak-tight joint, in a fitting 22 which has a screw mounting 23 in the open end of the end member 12 and is internally threaded to provide a screw mounting 24 for a screw plug 25 which carries the electric heating element.

This heating element comprises a wire 30 wound on a core of insulation 31 and preferably separated from the inner surface of the inner tubular metal casing 20, within which it is located, by a layer of insulation 32, suitably mica. One end of the coil 30 —the left-hand end—is connected to a metal sleeve 33 passing through and insulated from the screw plug 25, such sleeve being provided with a flange 34 at its inner end and being threaded at its outer end to receive one or more clamping nuts 35 and a connector 36. The insulation 37, of course, separates the screw plug 25 from the flange 34 and the connector 36 as well as from the sleeve 35 proper. The other end—the right-hand end—of the coil 30 is connected to a metal disk 38 bearing against the end of the insulating core 31, into which disk is threaded the end of a central rod 39 which passes centrally through the core 31 and through the sleeve 33 and is threaded at its outer end to receive clamping nuts 40 and a connector 41. The rod 39 is preferably square where it passes through the sleeve 33, and is provided with a collar 42, conveniently screw-mounted on it, interposed between the core 31 and sleeve 33. The rod 39, the collar 42, and the connector 41 are insulated from the sleeve 33 by suitable insulation 43. The nuts 40, or at least the inner nut 40, are sufficiently small to permit the nuts 35 to slip over them. By tightening the nuts 40 the sleeve 33 is clamped between such nuts and the collar 42; and the core 31 is clamped between such collar 42 and the disk 38. Each of these clamping actions is independent of the other, so that the rod 39 remains tight in the sleeve 33 even though the core 31 becomes loose upon being heated or is entirely removed from the rod 39, and so that the core 31 will remain tight on the rod 39, even though the latter is removed from its supporting sleeve 33. The two connectors 36 and 41 are suitably connected by wires 44 to a suitable source of current 45, such as a battery, with a suitable control switch 46 interposed in the circuit.

In operation, the closing of the switch 46 completes the circuit for the heating coil 30, by way of the wire 44, the connector 36, the sleeve 33, the coil 30, the disk 38, the rod 39, the connector 41, and the other wire 44. This heats the thin layer of fuel in the annular space 21, and eventually vaporizes it. The outlet of the fuel through the passage 14 may be controlled by the valve 16, which is opened after the lapse of a sufficient interval after the closing of the switch 46 to permit some vaporization of the fuel in the space 21. As the vaporized fuel is discharged past the valve 16 to the burner 15, more fuel is supplied by way of the pipe 13 to such space 21, so that a continuous supply is maintained. After the burner is in operation, the flames therefrom may play on the outside of the outer casing 10 to heat it, whereupon the switch 46 may be opened to shut off the current, and the further vaporization obtained by the flames of the already vaporized fuel.

The heater may be taken apart at either the joint 23 or the joint 24. By unscrewing the joint 24, the heating element as a unit is taken out of the inner tube 20, leaving the latter in place, so that the passage for the fuel is in no wise changed. This permits the heating element to be repaired while the device is in operation, or permits a new element to be substituted for a disabled one. In addition, if after the device is taken apart at the joint 24, it is possible to remove the screw plug 25, nuts 35, and connector 36 without in any way affecting the mounting of the heating element on the sleeve 33, as all of these parts will pass over the inner nut 40, which clamps the parts together, if the connector 41 is first removed. If the device is taken apart at the screw joint 23, the inner tube 20 is removed with the heating element; but even the passage of the liquid fuel to the burner 15 will not be interfered with if a screw plug is merely screwed into the fitting 12 in place of the fitting 22.

I claim as my invention:

1. A heating device for liquids, comprising an outer tube, an inner tube removably mounted within said outer tube by a screw joint so that a thin annular space for liquids is left between the two tubes, and a heating element removably mounted within said inner tube by a screw joint so that it may be removed therefrom without requiring the inner tube to be removed from the outer tube.

2. A heating device for liquids, comprising an outer tube, an inner tube removably mounted within said outer tube so that a thin annular space for liquids is left between the two tubes, and a heating element removably mounted within said inner tube so that it may be removed therefrom without requiring the inner tube to be removed from the outer tube.

3. A heating device for liquids, comprising an outer tube, an inner tube removably mounted within said outer tube so that a thin annular space for liquids is left between the two tubes, a heating element removably mounted within said inner tube so that it may be removed therefrom without requiring the inner tube to be removed from the outer tube, said removable heating element comprising a supporting member at one end, an insulating core, a clamping rod extending through said supporting element and said core and clamping them, said clamping rod and said supporting element being insulated from each other, and a heating conductor carried by said insulating core and having its two ends connected respectively to said supporting element and to said clamping rod.

4. A heating device for liquids, comprising an outer tube, an inner tube removably mounted within said outer tube so that a thin annular space for liquids is left between the two tubes, a heating element removably mounted within said inner tube so that it may be removed therefrom without requiring the inner tube to be removed from the outer tube, said removable heating element comprising a supporting member at one end, an insulating core, a clamping rod extending through said supporting element and said core and clamping them, and a heating conductor carried by said insulating core.

5. A heating device for liquid fuel, comprising an outer tube, an inner tube removably mounted within said outer tube so that a thin annular space for liquid fuel is left between the two tubes, and a heating element removably mounted within said inner tube so that it may be removed therefrom without requiring the inner tube to be removed from the outer tube, in combination with a burner connected to said heating device to be supplied with liquid fuel therethrough, said burner being arranged to heat said heating device.

6. In combination, a burner for liquid fuel, a heating device through which liquid fuel is supplied to said burner, said heating device being arranged to be heated externally by said burner and also having an electric heating element within it whereby it may be electrically heated internally.

7. In combination, a burner for liquid fuel, a heating device through which liquid fuel is supplied to said burner, said heating device being arranged to be heated by said burner and also having an electric heating element whereby it may be electrically heated.

8. In combination, a heater plug for removable insertion through a wall into a fluid container to heat the fluid in such container, comprising a threaded plug, a tube projecting therefrom, said tube being closed at the end remote from said plug, and an electrical heating conductor mounted within said tube.

9. In combination, a heater plug for removable insertion through a wall into a fluid container to heat the fluid in such container, comprising a threaded plug, a tube projecting therefrom, and an electrical heating conductor mounted within said tube.

10. A heating device for liquids, comprising an outer tube, an inner tube removably mounted within said outer tube so that a thin annular space for liquids is left between the two tubes, a heating element removably mounted within said inner tube so that it may be removed therefrom without requiring the inner tube to be removed from the outer tube, said removable heating element comprising a supporting member at one end, an insulating core, a clamping rod extending through said supporting element and said core and clamping them, said clamping rod and said supporting element being insulated from each other, a heating conductor carried by said insulating core and having its two ends connected respectively to said supporting element and to said clamping rod, and a screw plug within which such supporting element is mounted and from which it is insulated.

11. A heating device for fluids, comprising a tube having a support at one end, a screw plug detachably mounted in said support, a supporting member mounted in and insulated from said screw plug, a core, a clamping rod clamping said core and said supporting member and extending through them and insulated from the supporting member, and a heating coil wound on said core and having terminals connected respectively to said clamping rod and to said supporting member.

12. A heating device for fluids, comprising a tube having a support at one end, a screw plug detachably mounted in said support, a supporting member mounted in and insulated from said screw plug, a core, a clamping rod clamping said core and said supporting member and insulated from the supporting member, and a heating coil wound on said core and having terminals connected respectively to said clamping rod and to said supporting member.

13. A heating device for fluids, comprising a tube having a support at one end, a screw plug detachably mounted in said support, a supporting member mounted in and insulated from said screw plug, a core, a clamping rod clamping said core and said supporting member and extending through them and insulated from the supporting member, a heating coil wound on said core and having terminals connected respectively to said clamping rod and to said supporting member, and an outer tube in which said first-named tube is mounted, said outer tube being provided with a support-receiving member in which said support is removably mounted with the first tube within the outer tube.

14. A heating device for fluids, comprising a tube having a support at one end, a screw plug detachably mounted in said support, a supporting member mounted in and insulated from said screw plug, a core, a clamping rod extending through said core and said supporting member and clamped to one independently of the other so that one may be removed from or become loose on the clamping rod while the other remains tight thereon, and a heating coil wound on said core and having terminals connected respectively to said clamping rod and said supporting member.

15. A heating device for fluids, comprising a tube having a support at one end, a screw plug detachably mounted in said support, a supporting member mounted in and insulated from said screw plug, a core, a clamping rod extending through said core and said supporting member and clamped to each independently of the other so that either may be removed from or become loose on the clamping rod while the other remains tight thereon, and a heating coil wound on said core and having terminals connected respectively to said clamping rod and said supporting member.

In witness whereof, I have hereunto set my hand at Indianapolis, Indiana, this 9th day of April, A. D. one thousand nine hundred and twenty-one.

JARL M. WEYDELL.